United States Patent
Vacante et al.

(12) 
(10) Patent No.: US 6,651,191 B1
(45) Date of Patent: Nov. 18, 2003

(54) TESTING OF POLICY PRIOR TO DEPLOYMENT IN A POLICY-BASED NETWORK MANAGEMENT SYSTEM

(75) Inventors: Robert C. Vacante, Ft. Collins, CO (US); Peter Thomas Houck, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 09/659,367

(22) Filed: Sep. 12, 2000

(51) Int. Cl.[7] ............................................. G06F 11/00
(52) U.S. Cl. ...................................................... 714/47
(58) Field of Search ................................ 714/47, 25.57

(56) References Cited

U.S. PATENT DOCUMENTS

| | | | |
|---|---|---|---|
| 4,756,019 A | | 7/1988 | Szybicki ..................... 379/112 |
| 5,577,198 A | * | 11/1996 | Willrett et al. ................. 714/33 |
| 5,594,792 A | | 1/1997 | Chouraki et al. |
| 5,696,486 A | | 12/1997 | Poliquin et al. ............. 340/506 |
| 5,726,979 A | * | 3/1998 | Henderson et al. ......... 370/254 |
| 5,907,696 A | | 5/1999 | Stilwell et al. |
| 6,314,531 B1 | * | 11/2001 | Kram ........................... 714/38 |
| 6,317,788 B1 | * | 11/2001 | Richardson ................. 709/224 |
| 6,360,332 B1 | * | 3/2002 | Weinberg et al. ............... 714/4 |
| 6,381,604 B1 | * | 4/2002 | Caughran et al. ............. 707/10 |
| 6,470,464 B2 | * | 10/2002 | Bertram et al. ................ 714/37 |
| 6,556,659 B1 | * | 4/2003 | Bowman-Amuah .......... 568/76 |

FOREIGN PATENT DOCUMENTS

| | | |
|---|---|---|
| WO | WO99/14891 | 3/1999 |
| WO | WO01/44956 | 6/2001 |

OTHER PUBLICATIONS www.ericsson.com/datacom/new s/press_room/releases/19991012–0502.shtml, Oct. 12, 1999.

GB Search Report dated May 21, 2002, in connection with corresponding GB application No. 0121847.8.

* cited by examiner

Primary Examiner—Nadeem Iqbal
Assistant Examiner—Timothy M. Bonura

(57) ABSTRACT

The present invention provides a method of testing a policy to detect problems and provide a mechanism for user feedback in advance of policy deployment in a policy-based network management system, so that network traffic will not be affected by errors in deployment.

10 Claims, 7 Drawing Sheets

Type Three Testing

Policy Creation

Policy Assignment

Policy Deployment

Type One Testing

Type Three Testing

US 6,651,191 B1

TESTING OF POLICY PRIOR TO DEPLOYMENT IN A POLICY-BASED NETWORK MANAGEMENT SYSTEM

TECHNICAL FIELD

This invention relates generally to policy-based network management, specifically to the testing of policy prior to deployment in a policy-based network management system.

BACKGROUND OF THE INVENTION

The purpose of policy-based network management is to coordinate device management across an entity's network to enforce policies which relate to Service Level Agreements (SLAs). SLAs are agreements made between network users and the network provider. Policy is a method of translating those agreements into actions designed to provide the type and level of service agreed upon. These policies describe, in an easy to read format, sets of rules, where a rule specifies a set of conditions and an action to take when the conditions are satisfied. The conditions described in a policy generally relate to when policy should be enforced based on information embedded in the network traffic, and time conditions, etc. The actions described in a policy generally relate to Quality of Service (QoS) capabilities, e.g. bandwidth allocated or priority assigned to the traffic. By using policy-based network management, a structural format is provided wherein and network administrators can avoid the tedious process of individually configuring multiple network devices, such as routers, traffic shapers, each of which has its own particular syntax and mapping of QoS actions to device resources.

As used herein, a policy means the combination of one or more rules assigned to a network component or components. Thus any given component has only one policy per policy type assigned to it, each composed of a number of rules having their own conditions and resulting actions. As a result, such a system provides an administrator a great deal of leverage.

In general, the network administrator uses SLAs to author a set of policies of varying types, determine what enforcement points in the network should enforce these policies, and then deploy the policies to the enforcement points. The enforcement points are the components of the networks that are the targets/devices of the policy.

Deploying policy involves moving the policy onto the agent, translating the policy into target device-specific commands and applying these commands. Some targets/devices may be successfully configured, while others that cannot be configured are unable to enforce the policy. Without the ability to test a policy prior to policy deployment, it is not until this translation is in progress that such problems can be detected. As a consequence, the managed network may be placed into an ambiguous state, because when a policy deployment has failed to be completely deployed, until corrected, the network may be handicapped in its ability to carry traffic. At a minimum, the network is not able to manage traffic as intended by the network administrator creating the policy.

Currently, the effects of a policy deployment can be examined to determine what configuration changes were necessary to implement the policy. But at this point, the policy is already active and is impacting the flow of network traffic. Further, the inspection of configured network devices is a manual process, done out-of-band from the policy management system, with no correlation provided between a specific policy deployment and the device configuration.

What is needed is a mechanism which can detect problems and provide a mechanism for user feedback in advance of policy deployment, so that network traffic will not be affected.

SUMMARY OF THE INVENTION

An embodiment consistent with the present invention provides a method of testing a policy prior to deployment in a policy-based network management system. The method includes creating an abstract policy, typically by a console, storing the abstract policy, typically by a server, assigning the abstract policy to a specific target device, and transferring the assigned policy to an agent. The method further includes translating the assigned policy into specific configuration commands by the agent, testing the configuration commands prior to deployment by the specific target device, and deploying the configuration commands by the specific target device.

DETAILED DESCRIPTION OF THE INVENTION

The present invention detects in advance of policy deployment whether a policy can be implemented by a specific target device and provides user feedback, so that the network traffic will not be affected.

The following definitions are helpful to an understanding of the present invention.

A target is a controllable entity of an electronic device which is connected to the network, and is managed using a policy.

A network device has multiple interfaces, with each interface representing a connection to one or more networks. The network device's function is to route traffic between these networks. Further, each interface can have multiple capabilities, each of which can affect the traffic in different ways. Each capability on each interface is typically referred to as a target. Alternatively, any of the interfaces of the network device could be the target. The target on the network device could also be the priority queuing of messages on a specific individual interface, since it is at this point that the network traffic is actually affected.

Electronic systems, such as networks, that comprise resources or processes can control the interaction of such items by means of Quality of Service (QoS) mechanisms. These mechanisms can be controlled at a higher level of abstraction using rules, which relate an action, i.e., controlling the QoS mechanism, to a set of conditions describing when to apply the action. The combination of one or more rules for a given device is referred to herein as a policy. The controlled items could be, for example, processes, functions, abstract objects, or physical electronic devices such as computers, printers, etc. Thus, policy refers to the description of behaviors or actions that are desired for the item to which the policy applies. In network systems, policies are typically associated with items that affect the flow of data on that network. In order to affect that network traffic flow, policies are directed toward or targeted at managed or controlled entities. An example of a policy could be "assign highest priority to traffic from the user X".

Figure 1:
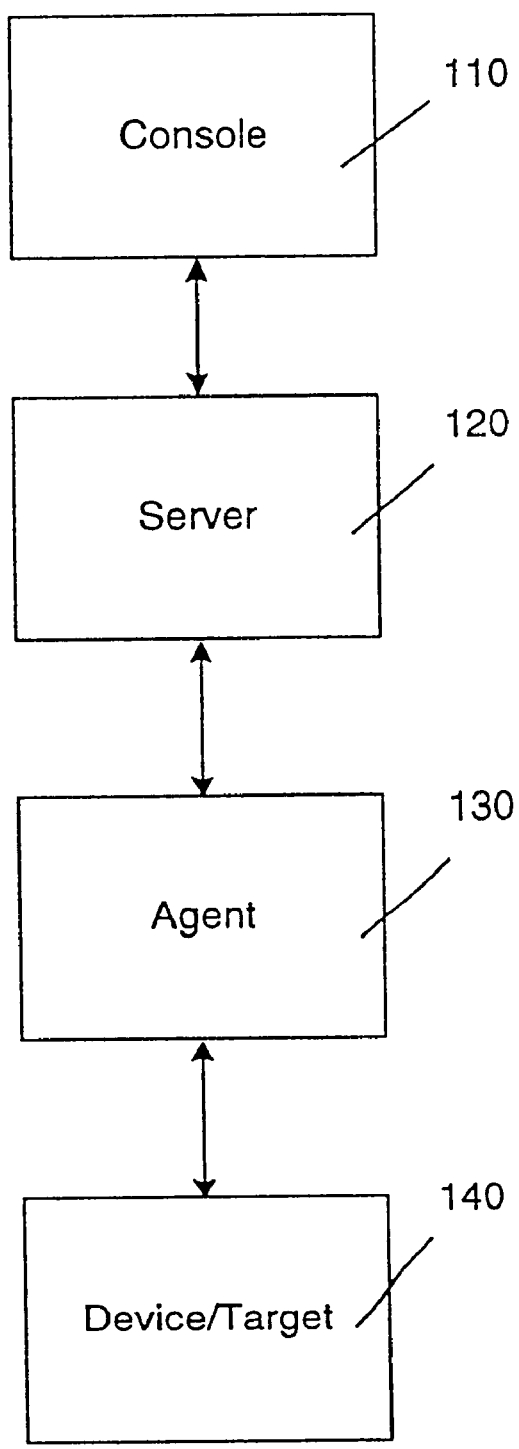
FIG. 1 is a typical system architecture for a network management system describing the relation of console, server, agent, and target device.

FIG. 1 illustrates a typical system architecture for a policy-based network management system. A console 110 typically supplies a client user interface to create, assign, and deploy policies. The console 110 sends abstract polices to a server 120, which typically provides storage and realization of the deployment. The server 120 communicates with an agent 130. The agent 130 typically resides in any general purpose computers, and is primarily responsible for translating abstract policies into target device-specific configuration commands. The agent 130 configures target devices 140 whose main function is to move traffic around the network. The console 110, server 120, agent 130, and target device 140 each typically include a processor operating under software control to perform the functions described below. In this exemplary embodiment, policies are created in the console 110, and stored in the server 120. However, those skilled in the art will recognize that other variations are possible for the creation and storage of policies.

Figure 2:
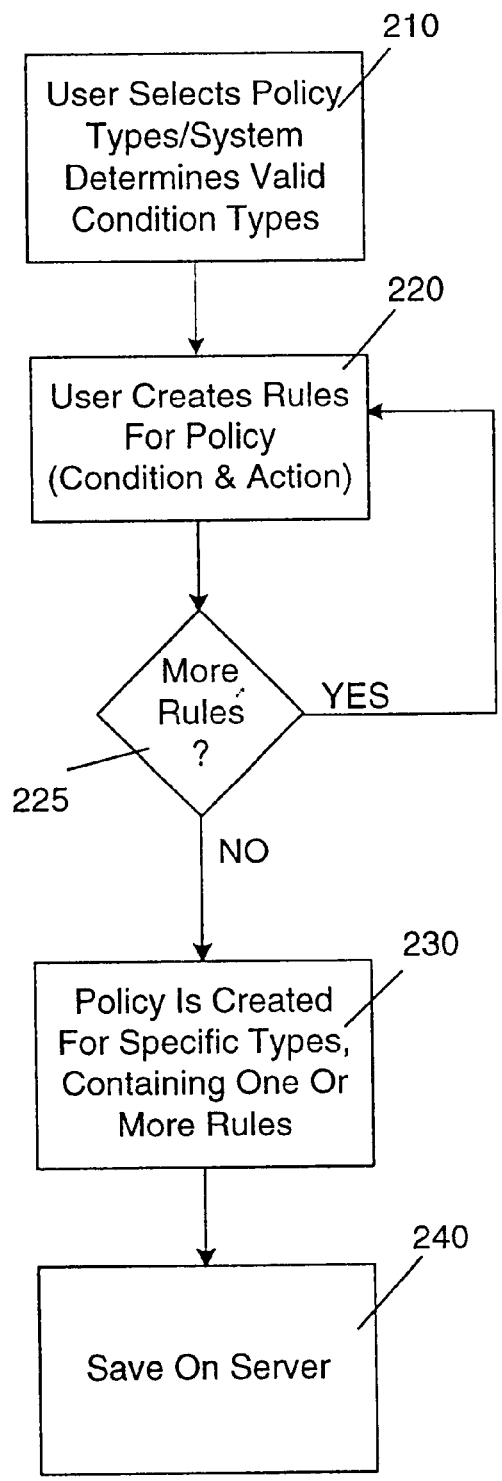
FIG. 2 is a flow chart of a typical Policy Creation process.

FIG. 2 illustrates a typical Policy Creation process. Policy creation requires specification of a policy type. A user, through the console 110, first selects the policy type. The console 110 then determines the range of condition types that may be utilized for the policy creation, step 210. The user then creates rules for the policy by selecting conditions and setting actions once the conditions are satisfied, step 220. If there are more rules to be created, step 220 repeats. When there are no more rules to be created, a specific policy is created, containing one or more rules, step 230. The abstract policy is saved on the server 120, step 240.

Once created, a policy is an abstract set of rules containing conditions which, when evaluated, determine how traffic on a network is to be handled. Given an appropriate agent, the policy can be enforced by any machine which the agent can support. This capability renders the product extensible, allowing configuration of devices from any vendor. The policy itself contains no targeting information, as it can be deployed to any device that supports the policy type.

Figure 3:
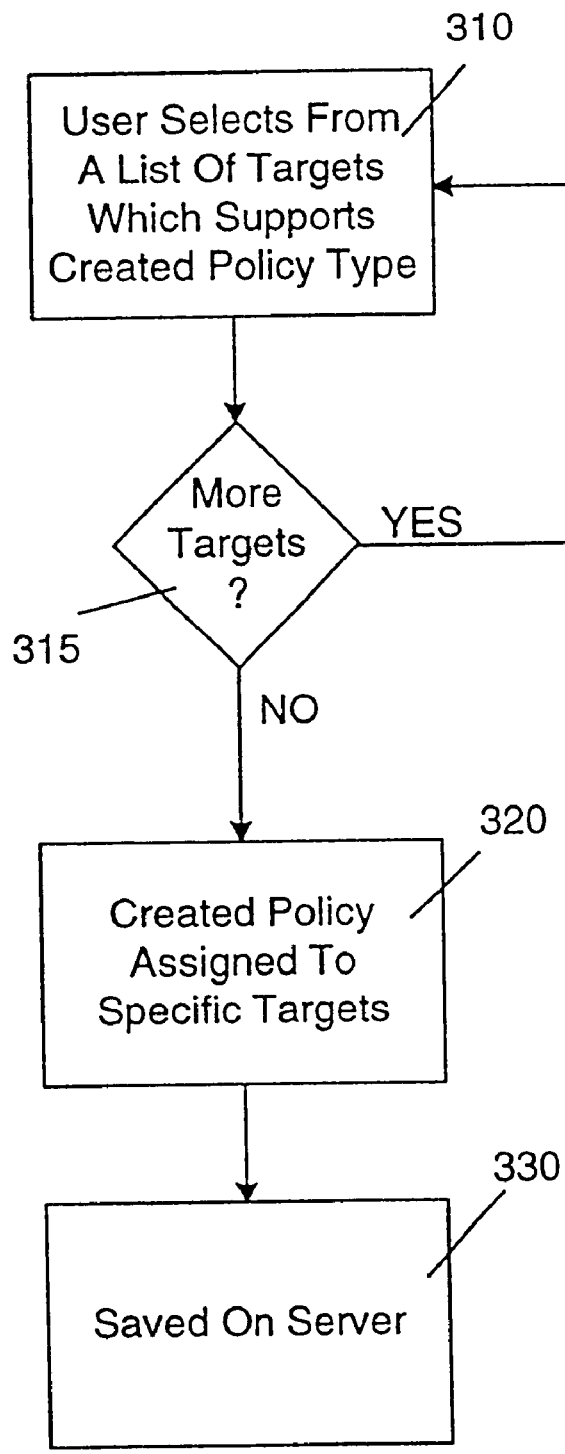
FIG. 3 is a flow chart of a typical Policy Assignment process.

FIG. 3 illustrates a typical Policy Assignment process, which is a step before policy deployment. A user, through the console 110, selects from a list of targets 140 which support the created abstract policy, step 310. As discussed above, a target is typically representative of a single capability on an interface on a network device. Once all desired targets which support the policy have been selected, the created abstract policy is assigned to the specific targets, step 320, and saved on the server, step 330.

Figure 4:
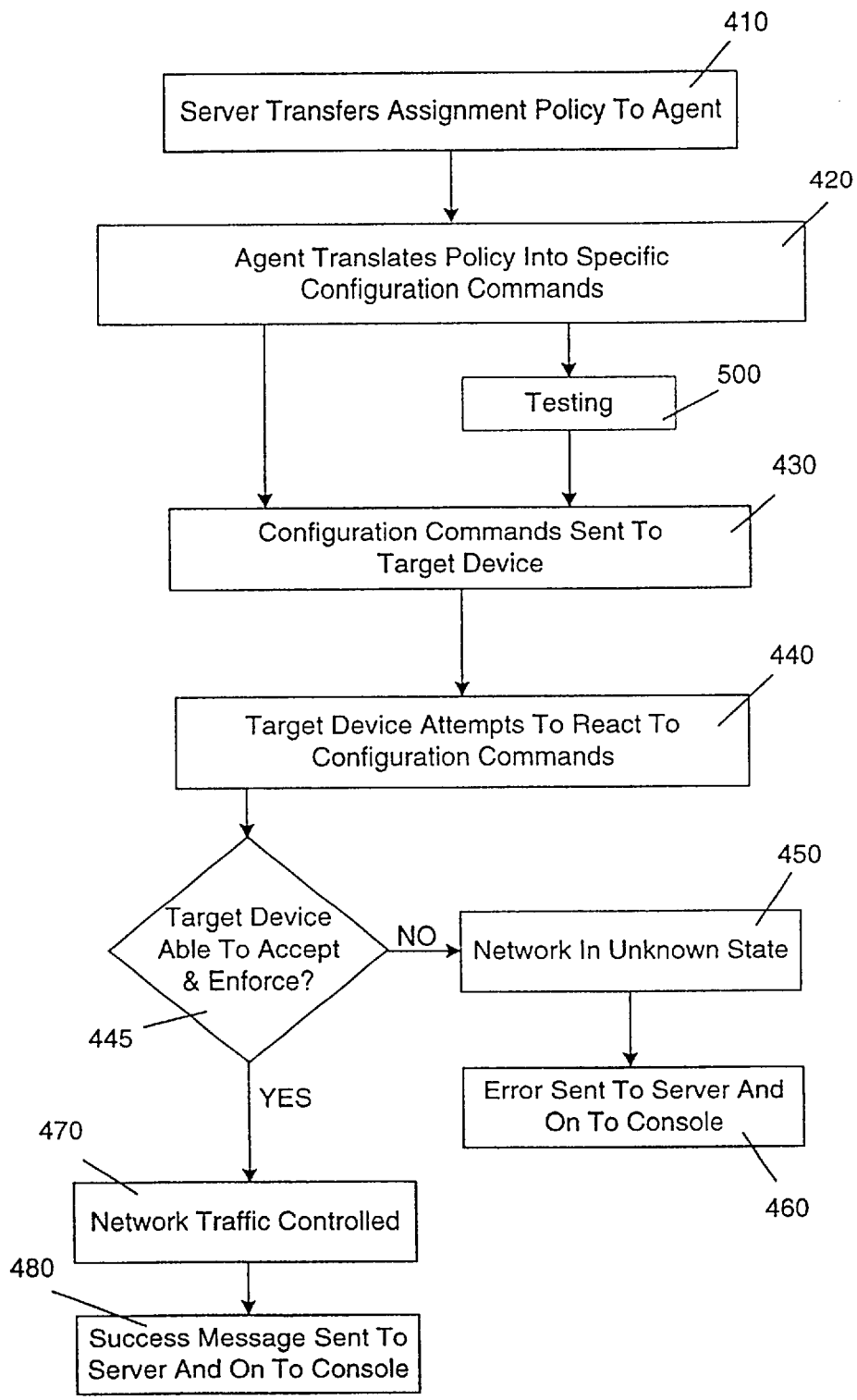
FIG. 4 is a flow chart of a typical Policy Deployment process.

FIG. 4 illustrates a typical Policy Deployment process. The server 120 first transfers the assigned policy to the agent 130, step 410. At a minimum, one agent 130 is required for each family of target devices 140 from a particular vendor being managed within the network. This agent 130 is typically specifically designed for this family of target devices 140, and is aware of the syntax, and, to some degree, the semantics of implementing policy on the device type it was created to manage.

In the next step, the agent 130 translates the policy into specific configuration commands, i.e., specific control sequences required to implement the semantics described by the rules and conditions of the policy, step 420. The configuration commands are then sent to the target device 140 under which the policy is to be enforced, step 430. Once translated by the specifically designed agent 130, the configuration commands can be applied to all the target devices 140 within the family.

In the next step, the target device 140 attempts to react to the configuration commands, step 440. Some target devices 140 may be successfully configured and are able to accept and enforce the policy, while others cannot be configured and are unable to implement the policy. This configuration failure may occur for any number of reasons, with the most likely causes discussed as follows.

1. Lack of Functionality on a Specific Device

When a policy is composed, the set of condition types available for policy composition is a superset of all condition types applicable for a policy type. Any given target device 140, however, is likely to support only a limited subset of these condition types. When a policy is deployed upon a target device 140 that cannot support one of its conditions, the policy may be partially enforced or may not be enforced at all. Since a policy is typically deployed in parallel to multiple target devices 140, the network is left in an indeterminate state, even though all other target devices 140 are able to enforce the policy.

2) Scarcity of Resources (e.g. Memory)

A policy, when deployed to a network device, often consumes resources such as memory to store parameters and configuration information required to enforce a given policy. At some point, these resources will be exhausted and it will no longer be possible to deploy any additional policies.

3) Policy Conflicts

When a policy is translated by an agent into specific configuration changes, it is possible that the changes required to implement a new policy would nullify all or part of a previously deployed policy. This may be due to user error in which two policies contain explicit conditions that conflict. An example will be, one policy grants address A high priority, while another policy denies access to address A. The policy conflicts may also be caused by the specific method utilized by an agent 130 to implement a policy. For example, during deployment, an agent 130 may set a configuration parameter that is a global setting for the target device. When deploying another policy, modification of this same parameter may be required. As a result, deployment of this second policy would affect the operation of the first.

When a policy is applied to two or more target devices 140, the configuration failure of any one will affect the traffic flow of the network and put it in an indeterminate state.

When the target device 140 is able to accept and enforce the configuration commands translated by the agent 130, the network traffic is properly controlled, step 470, and a success message is sent to the server 120, and/or further on to the console 110 for the user interaction, step 480.

However, if the target device 140 is unable to accept and enforce the configuration commands, due to the causes described above, the network may put in an unknown ambiguous state, step 450. This is because when a policy deployment has failed to be completely deployed, until corrected, the network may be handicapped in its ability to carry traffic. At a minimum, the network is not able to manage traffic as intended by the network administrator creating the policy. At this point, an error message is sent to server 120, and/or on to the console 110, left for the user to correct, step 460.

In order to detect any problems in advance of policy deployment, a test interface is required, and the software responsible for the final translation and implementation of a policy must include additional capabilities to facilitate the testing. An agent 130 is typically responsible for translating and implementing a policy.

An embodiment consistent with the present invention provides a combination of three types of testing, each providing a different test capabilities. These three types are not exclusive of each other. One can be used alone, or any two or all three can be combined to provide the appropriate level of functionality. Testing is performed at step 500, which is between the steps of translating a policy into specific configuration commands, step 420, and sending configuration commands to the targets target device 140, step 430.

1) Type One Testing

This is the most fundamental level of testing, which only provides users with basic information such as what steps will be taken by the agent 130 to affect changes on the managed target device 140. To perform this type of testing, the agent 130 acts very much the same way as when deploying a policy. When instructed to test a policy, the agent 130 translates the policy from its generic form into configuration commands for execution on the target device 140, step 410 and 420. This is also done in almost the same way as when deploying. The single difference is that instead of directing these commands at the targets target device 140, the commands are captured and are sent back to the source, typically the server 120 and on to the console 110. In another words, the commands are sent to the originator of the testing request, typically the user, step 510. This output may then be interpreted by another software component for validity. Alternately, the user may be presented with a listing of the commands that would be executed and can interpret the effect of the actual execution on the target's configuration. The user can then determine if the resulting configuration is acceptable, and if so, continue the policy deployment.

Figure 5:
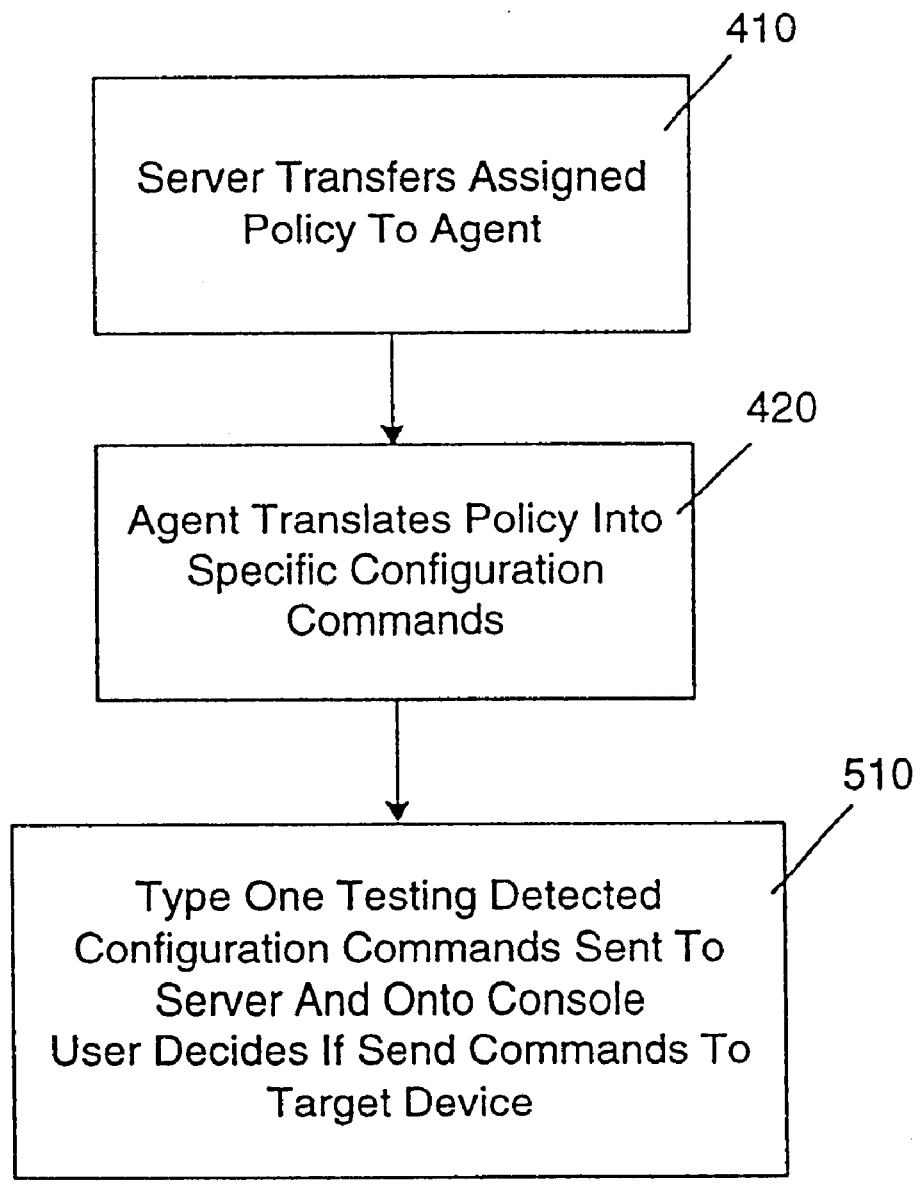
FIG. 5 is a flow chart of a Type One Testing process.

FIG. 5 is a flow chart describing the operation of the type one testing.

This type of testing requires users to understand the target device 140 very well to be able to interpret the commands.

2) Type Two Testing

The second type of testing provides the most functionality, but is also the most difficult to implement. This level of testing tests the deployment on a target without actually interacting with the target, by applying the policy on a backup target device 140 or a device emulator. The advantage is that the testing results can be provided without any effect on the running configuration. This may be accomplished using either of two methods.

The first method requires that a similar, preferably identical, target device 140 be available for the trial of the policy. This backup target device 140 does not need to be a complete, unused networking device. A single unused interface is sufficient depending on the granularity of the configuration. As a first step, the active configuration is copied to a backup configuration so that they mirror each other. This backup configuration is then uploaded to the backup target device 140, to which the policy is sent for testing. All major steps of a deployment are duplicated. Commands generated are recorded, errors in deployment are noted, configuration data is extracted, and all are returned to the component originating the test request. The current configuration of the final target device 140 is optionally returned as well to provide a basis for comparison. If the consumer of this information, which could be an user or a software processor, deems the changes appropriate, policy deployment to the final target device 140 may be initiated.

The second method requires that the software which simulates configuration behavior of the managed device to be a sub-component of or a separate component with services available to the agent 130. As in method one, the running configuration or the final target 140 is extracted, and copied to the software simulator. Then the policy is test deployed to the software simulator, and data is collected. This data is returned to the originator of the test request, which uses the data for its required purpose.

Figure 6:
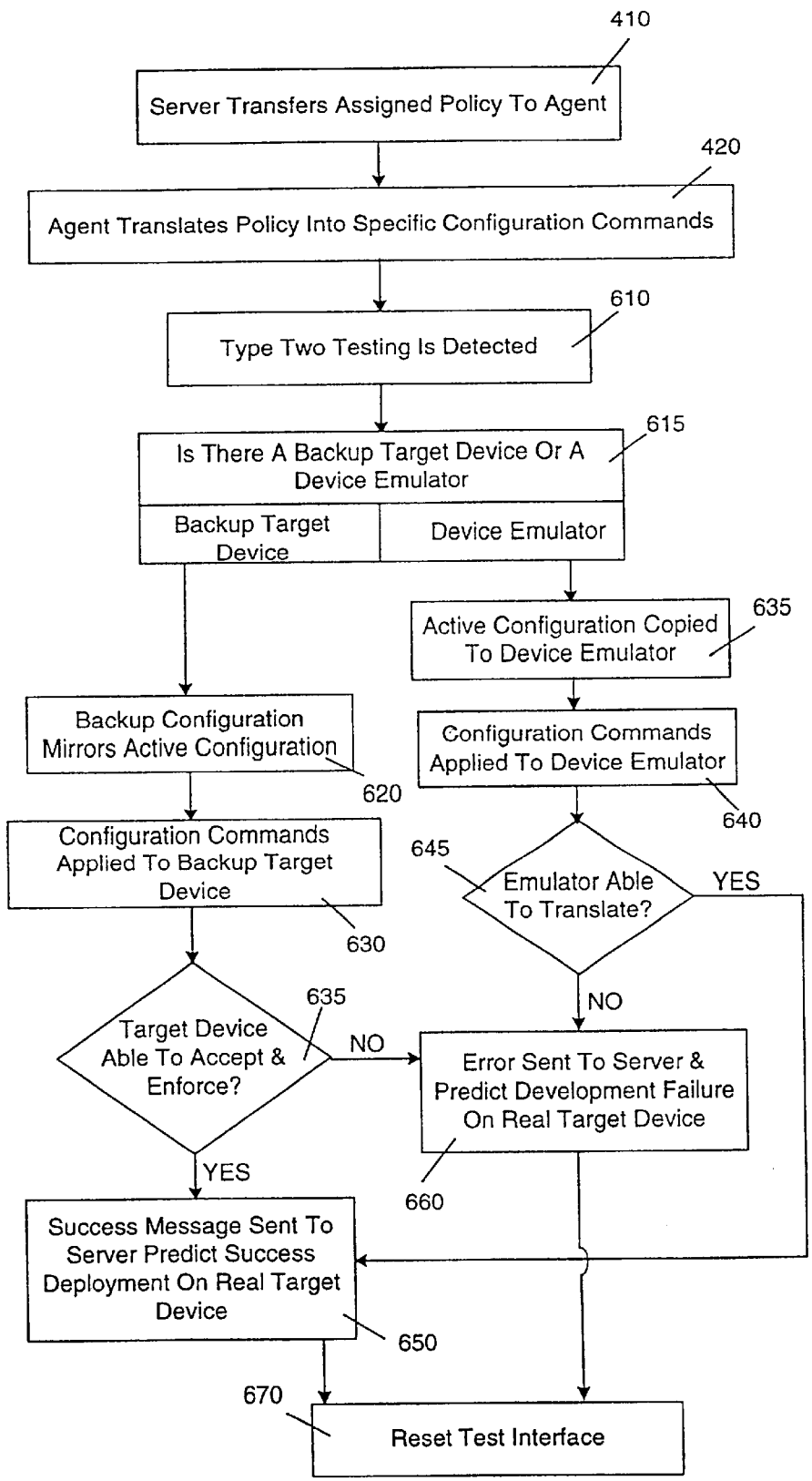
FIG. 6 is a flow chart of a Type Two Testing process.

FIG. 6 is a flow chart describing in detail the operation of the type two testing.

After the server 120 transfers the assigned policy to the agent 130, the agent 130 translates the policy into specific configuration commands, step 410 and 420. Then, when level two testing is detected, step 610, the agent 130 attempts to find a back up target device 140, step 615. As discussed above, a backup target device 140 is a similar, preferably identical, device.

If the testing is done on a backup target device 140, the active configuration is copied to the backup target device 140, so that the backup configuration mirrors the real active configuration, step 620. The testing is done by applying the configuration commands to the backup target device 140, step 630. This is the method one testing discussed above.

If the target device 140 is able to accept and enforce the configuration commands, a successful test deployment message is sent to the server 120, and/or on to the console 110, predicting successful deployment on the actual real target device 140, step 650.

If the target device 140 is unable to accept and enforce the configuration commands, an error message is sent to the server 120, and/or on to console 110, predicting deployment failure on the actual real target device 140, step 660.

If, on the other hand, the testing is done on a device emulator, the active configuration is copied to the device emulator, step 635. Then the configuration commands are applied to the device emulator, step 640. If the device emulator is able to accept the configuration commands, a success message is sent to the server 120, step 650. If the device emulator is unable to accept, an error message is sent, step 660. This is the method two testing discussed above.

In the final step, test interface is reset to the state before the testing, step 670.

3) Type Three Testing

In the third type of testing, an unused target device or device emulator is not required. This type of testing provides the outcome of a policy deployment on the target device 140 itself, using the active and/or backup configurations on the target device 140. Ideally, this would occur without affecting the running configuration of the target device 140. This may be accomplished using one of the following three methods, all implemented within the agent 130.

For the first method, the target device 140 must contain both an active and a backup configuration and be able to direct configuration commands to either. Testing is accomplished as follows. First, the target device 140 is directed to mirror the active configuration into the backup configuration. Then the policy deployment is set to occur in the backup rather than the active configuration. Policy is test-deployed to the backup configuration and any errors or conflicts occurring during translation are detected. As before, original configuration, commands for configuration, errors in implementation, and resultant configuration information are made available for interpretation or further processing. If deployment is desired, it can be accomplished by changing one of the two configuration images to be active, perhaps requiring mirroring the backup into the active.

The second method applies when the target device 140 provides for the storage of a backup configuration, but does not provide a mechanism to configure or reconfigure the backup configuration. Upon instruction to test a policy, the agent 130 instructs the target device 140 to copy the running configuration into the backup, as in method one. Since configuration of the backup is not possible, the testing occurs on the active configuration. Data regarding the results are reported to the originator, typically a user, as described before. After collecting this information for reporting, the target device 140 is immediately returned to its original state by copying the backup configuration into the active configuration. The disadvantage of this method is that the target device 140 will be active and running the proposed configuration for a certain period until its original state can be restored, i.e. there is a time gap, typically a few seconds.

The third method is available regardless of number of configuration images available. Unlike methods one and two, which both require a backup configuration, this method utilizes external storage for backups. As a first step, the agent 130 backs up the active configuration image to a storage that it manages, such as a fixed storage or the memory within the system running the agent 130. TFTP is a common method for uploading and downloading device images. The agent 130 modifies the active configuration on the device, and the results are collected and propagated. The agent 130 then returns the target device 140 to its original configuration by uploading the previously stored device image to the active, running configuration. As in method two, the device is running the policy to be tested until the backup can be restored.

Figure 7:
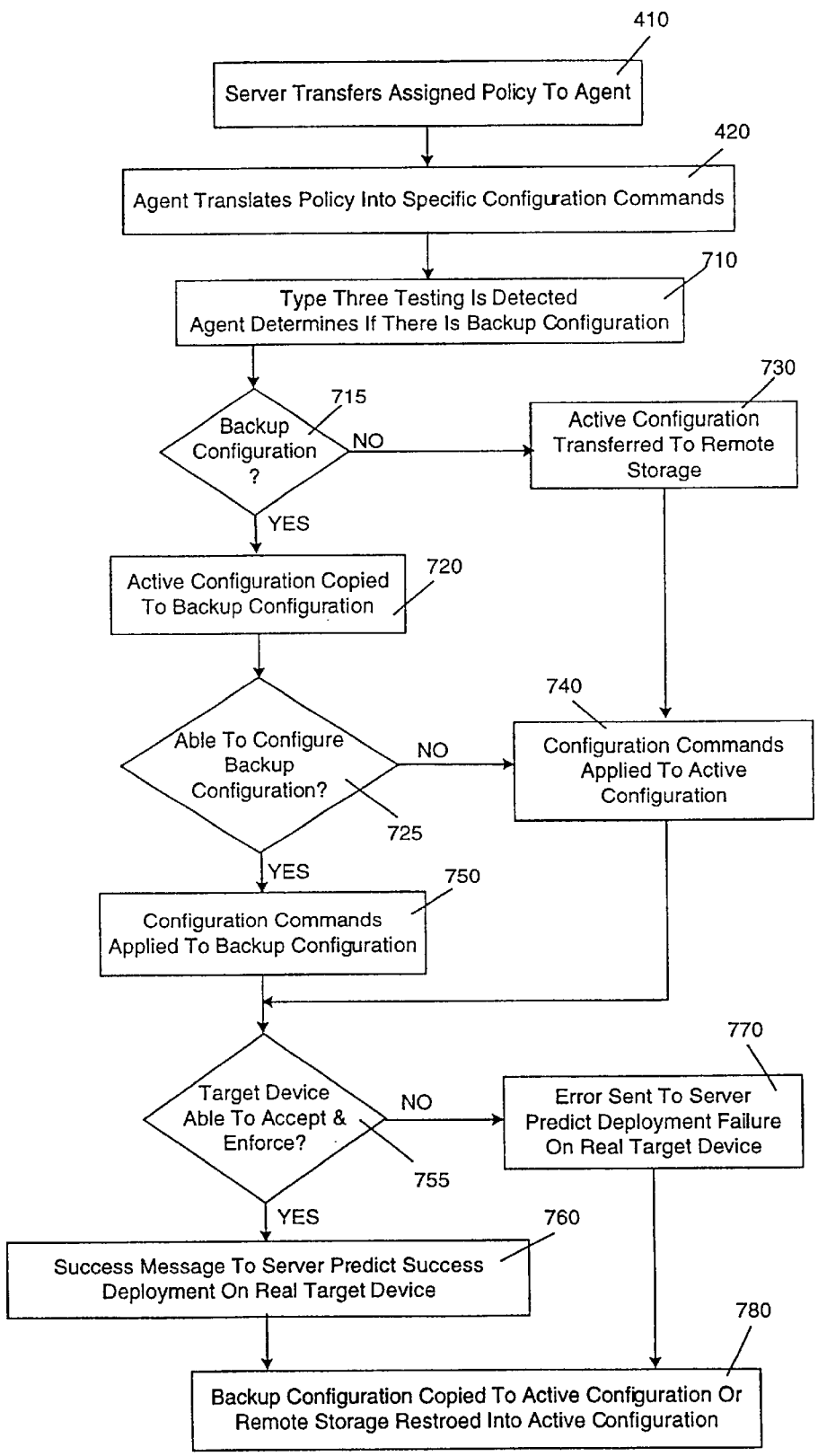
FIG. 7 is a flow chart of a Type Three Testing process.

FIG. 7 is a flow chart describing in detail the operation of the type three testing.

After the server 120 transfers the assigned policy to the agent 130, the agent 130 translates the policy into specific configuration commands, steps 410 and 420. Then, when level three testing is detected, the agent 130 determines if the target device 140 contains both an active and a backup configuration, step 710.

If there is a storage for the backup configuration, an image of the active device configuration on the target device 140 is copied to the backup configuration, step 720. However, not all backup configurations can be configured.

If the backup configuration can be configured, the testing is done by applying the configuration commands to the backup configuration, step 750. This is the method one testing discussed above.

On the other hand, if the backup configuration cannot be configured, the testing is done by applying the configuration commands to the active configuration, step 740. This is the method two testing discussed above.

If the target device 140 is able to accept and enforce the configuration commands, a successful test deployment message if sent to the server 120, and/or on to the console 110, predicting successful deployment on the actual real target device 140, step 760.

If the target device 140 is unable to accept and enforce the configuration commands, an error message is sent to the server 120, and/or on to console 110, predicting deployment failure on the actual real target device 140, step 770.

In the final step, if the testing is done on the active configuration, method two testing, the stored backup configuration, is copied to the active configuration, step 780, restoring it to the original state before the test.

If, however, there is no storage for backup configuration, then the active configuration is transferred and stored to a remote storage, step 730. Testing is done by applying the configuration commands to the active configuration, step 740. If the target device 140 is able to accept the configuration commands, then a success message if sent to the server 120. If the target device 140 is unable to accept the configuration commands, then an error message if sent, step 770. In the final step, the backup configuration stored in the remote storage is copied to the active configuration, step 780, restoring it to the original state before the test. This is the method three testing discussed above.

In summary, in the type three testing, if a backup configuration is available, the active configuration is copied into the backup configuration, method one or two. If the backup configuration is not available, the active configuration is backed up into an external storage, method three. If the backup configuration is available and configurable, the test deployment occurs in the backup configuration, method one. If the backup configuration is not available or configurable, the test deployment occurs in the active configuration, and the original configuration is restored from the backup configuration, method two, or the external storage, method three.

While the present invention has been described in connection with an exemplary embodiment, it will be understood that many modifications will be readily apparent to those skilled in the art, and this application is intended to cover any variations thereof.

What is claimed is:

1. A pre-deployment policy testing mechanism in a policy-based network management system, comprising:
   abstract policies to be enforced by network target devices for the control of network traffic;
   an agent which translates the abstract policies into specific configuration commands; and
   a test interface which provides testing of the specific configuration commands on specific target devices prior to the policy deployment, wherein the test interface further comprises a backup target device for the testing.

2. A pre-deployment policy testing mechanism in a policy-based network management system, comprising:
   abstract policies to be enforced by network target devices for the control of network traffic;
   an agent which translates the abstract policies into specific configuration commands; and
   a test interface which provides testing of the specific configuration commands on specific target devices prior to the policy deployment, wherein the test interface further comprises a remote storage to store an active configuration during the testing, and the testing is done on the active configuration.

3. A method of testing a policy prior to deployment in a policy-based network management system, comprising:
   creating an abstract policy;
   storing the abstract policy;
   assigning the abstract policy to a specific target device;
   transferring the assigned policy to an agent;
   translating the assigned policy into specific configuration commands by the agent;
   testing the configuration commands prior to deployment by the specific target device, wherein the testing step is accomplished using a backup target device or a device emulator,
   wherein the testing step further comprises:
      detecting a backup target device by the agent;
      copying an active configuration to the backup target device;

applying the configuration commands to the backup target device;

returning the testing result to users; and resetting the test interface; and deploying the configuration commands by the specific target device.

4. The method of claim 3, wherein the returning the testing result step further comprises:

sending an error message to the users; and predicting a deploying failure on a real target device.

5. A method of testing a policy prior to deployment in a policy-based network management system, comprising:

creating an abstract policy;

storing the abstract policy;

assigning the abstract policy to a specific target device;

transferring the assigned policy to an agent;

translating the assigned policy into specific configuration commands by the agent;

testing the configuration commands prior to deployment by the specific target device, wherein the testing step is accomplished without a backup target device or a device emulator, wherein the testing step further comprises:

detecting a storage for a backup configuration;

copying an active configuration to the backup configuration;

applying the configuration commands to the backup configuration; and returning the testing result to users; and deploying the configuration commands by the specific target device.

6. The method of claim 5, wherein the returning the testing result step further comprises:

sending an error message to the users; and predicting a deploying failure on a real target device.

7. A method of testing a policy prior to deployment in a policy-based network management system, comprising:

creating an abstract policy;

storing the abstract policy;

assigning the abstract policy to a specific target device;

transferring the assigned policy to an agent;

translating the assigned policy into specific configuration commands by the agent;

testing the configuration commands prior to deployment by the specific target device, wherein the testing step is accomplished without a backup target device or a device emulator, wherein the testing step further comprises:

detecting a storage for a backup configuration;

copying an active configuration to the backup configuration;

applying the configuration commands to the active configuration;

returning the testing result to users; and copying the backup configuration to the active configuration; and deploying the configuration commands by the specific target device.

8. The method of claim 7, wherein the returning the testing result step further comprises:

sending an error message to the users; and predicting a deploying failure on a real target device.

9. A method of testing a policy prior to deployment in a policy-based network management system, comprising:

creating an abstract policy;

storing the abstract policy;

assigning the abstract policy to a specific target device;

transferring the assigned policy to an agent;

translating the assigned policy into specific configuration commands by the agent;

testing the configuration commands prior to deployment by the specific target device, wherein the testing step is accomplished without a backup target device or a device emulator, wherein the testing step further comprises:

transferring an active configuration to a remote storage;

applying the configuration commands to the active configuration;

returning the testing result to users; and restoring the remote storage configuration into the active configuration; and deploying the configuration commands by the specific target device.

10. The method of claim 9, wherein the returning the testing result step further comprises:

sending an error message to the users; and predicting a deploying failure on a real target device.

* * * * *